United States Patent [19]

Nakagawa

[11] Patent Number: 5,705,550
[45] Date of Patent: Jan. 6, 1998

[54] POLYARYLENE SULFIDE RESIN COMPOSITION

[75] Inventor: Nozomu Nakagawa, Shizuoka, Japan

[73] Assignee: Polyplastics Co., Ltd., Osaka, Japan

[21] Appl. No.: 697,350

[22] Filed: Aug. 22, 1996

[30] Foreign Application Priority Data

Aug. 24, 1995 [JP] Japan ............................ 7-215811

[51] Int. Cl.$^6$ ...................................... C08K 5/10
[52] U.S. Cl. ................... 524/311; 524/314; 524/315; 524/318; 524/609
[58] Field of Search ........................ 524/311, 314, 315, 318, 609

[56] References Cited

U.S. PATENT DOCUMENTS

| | | | |
|---|---|---|---|
| 3,652,610 | 3/1972 | Coopersmith et al. | 260/410.6 |
| 4,395,509 | 7/1983 | Blackwell et al. | 524/127 |
| 4,414,250 | 11/1983 | Costanza et al. | 427/386 |
| 4,933,386 | 6/1990 | Nitoh et al. | 524/127 |
| 4,942,194 | 7/1990 | Bier et al. | 524/287 |

FOREIGN PATENT DOCUMENTS

| | | |
|---|---|---|
| 0 236 835 | 9/1987 | European Pat. Off. . |
| 0 292 275 | 11/1988 | European Pat. Off. . |
| 0 556 662 A1 | 8/1993 | European Pat. Off. . |
| 1 232 963 | 2/1967 | Germany . |
| 44 3 730 A1 | 4/1995 | Germany . |
| 54-47752 | 4/1979 | Japan . |
| 58-74751 | 5/1983 | Japan . |
| 60-229949 | 11/1985 | Japan . |
| 63-289068 | 11/1988 | Japan . |

*Primary Examiner*—Ralph H. Dean
*Attorney, Agent, or Firm*—Depaoli & Frenkel, P.C.

[57] ABSTRACT

A polyarylene sulfide resin composition is improved in mold releasing characteristics in molding, is thermally and chemically stable, evolves little decomposition gases and exhibits excellent mechanical characteristics. The composition can be prepared by blending (A) 100 parts by weight of a polyarylene sulfide resin with (B) 0.01 to 5 parts by weight of an ester compound composed of a polybasic aliphatic carboxylic acid and a monohydric aliphatic alcohol.

11 Claims, No Drawings

POLYARYLENE SULFIDE RESIN COMPOSITION

[FIELD OF INVENTION]

The present invention relates to a polyarylene sulfide resin composition for molding, particularly injection molding. More specifically, the present invention relates to a polyarylene sulfide resin composition. In particular the polyphenylene sulfide resin composition is improved in mold-releasing characteristics from the metal surface during the molding step, is thermally and chemically stable with a little amount of evolved decomposition gases and exhibits excellent mechanical characteristics.

[PRIOR ART]

A thermoplastic resin which is excellent in mechanical characteristics and exhibits a high thermal resistance, a chemical resistance and flame retardance has been needed for material of components or parts of electrical or electronic equipments, automobile parts or chemical instruments.

Polyarylene sulfide (hereinafter abbreviated to "PAS") resin represented by polyphenylene sulfide (hereinafter abbreviated to "PPS") is one of the resins meeting this need. In particular, demand for PAS resin compositions containing inorganic fibrous reinforcements such as glass fiber continues to expand, owing to their excellent mechanical strength and a high performance for cost.

However, PAS resin is troublesome in the releasing action from a metal mold during molding for reasons that the resin exhibits a high affinity with the metal, that a shrinkage factor of the resin observed during solidifying step from the molten state is small, and that the resin is often molded into precision articles with use of molds having complicated shapes. Therefore, PAS resin is problematic in that the stably continuous molding step is sometimes difficult and that the molding speed is low (i.e., the molding cycle is long) to result in a poor productivity.

Therefore, it is a usual practice in the art to add a mold-releasing agent to PAS resin to mold. The following mold-releasing agents and processes for improving the mold releasing characteristics have already been proposed:

(1) a process of adding a metal salt of a fatty acid such as zinc stearate and lithium stearate (JP-A 54-162752), (2) a process of adding a polyolefin such as polyethylene and polyethylene wax (JP-A 54-47752, JP-A 60-229949), (3) a process of adding an ester compound of a polyhydric alcohol with a monobasic fatty acid, for example, glycerol tristearate or pentaerythritol tetrastearate (JP-A 58-74751, JP-A 63-289068), and (4) a process of adding a fatty acid amide such as N,N'-alkylenebisalkanamide (U.S. Pat. No. 4,395,509).

However, those processes still have problems that the mold releasing characteristics are not sufficiently improved; that although they are useful to the mold releasing characteristics, the mold releasing-agent is decomposed to evolve gas in preparing the composition or in molding when the thermal decomposition temperature is lower than the melt processing temperature of PAS resin, so that the resulting molded article may unfavorably have so-called burn marks on the surface; and that the resulting composition may be lowered in mechanical characteristics.

[DISCLOSURE OF THE INVENTION]

Under these circumstances, the inventors of the present invention have intensively studied for the purpose of solving the above problems of PAS resin and its compositions, particularly improving the mold releasing characteristics in molding remarkably, to thereby obtain at high efficiency a molded article being excellent in appearance, mechanical strengths, thermal properties and chemical properties. As a result of the studies, the present invention has been accomplished.

Namely, the present invention relates to a polyarylene sulfide resin composition prepared by blending (A) 100 parts by weight of a polyarylene sulfide resin with (B) 0.01 to 5 parts by weight of an ester compound composed of an at least dibasic aliphatic carboxylic acid and a monohydric aliphatic alcohol, and (C) 0 to 300 parts by weight of a filler, as basic constituents. That is, the present invention relates to a composition comprising the constituents (A), (B) and (C). (B) is an ester compound composed of a polybasic aliphatic carboxylic acid and a monohydric aliphatic alcohol. It is desirable that the composition may be well blended and kneaded.

Further, the present invention also provides another composition prepared by further adding (D) 0.005 to 2 parts by weight of boron nitride to the above composition comprising the constituents (A) to (C), which is more remarkably improved in the properties which the present invention aims.

The constituents of the composition of the present invention will now be described.

The PAS resin (A) to be used in the present invention is one composed mainly of repeating —(Ar—S)— units (wherein —Ar— is arylene). Examples of the arylene include p-phenylene, m-phenylene, o-phenylene, substituted phenylene, p,p'-diphenylene sulfone, p,p'-biphenylene, p,p'-diphenyelne ether, p,p'-diphenylenecarbonyl and naphthalene. In the present invention, a homopolymer may be used, which is composed of the same repeating arylene sulfide units wherein the arylene is selected from among the groups described above. In some case, the use of a copolymer composed of different species of repeating arylene sulfide units is favorable from the standpoint of processability of the composition.

Para-Phenylene sulfide homopolymer is particularly preferably used as the homopolymer.

Although the copolymer may be composed of two or more different species of repeating arylene sulfide units wherein the arylene units are selected in combination from among the groups described above, it is particularly preferable to use a copolymer comprising p-phenylene sulfide units and m-phenyelne sulfide units in combination. In particular, it is suitable from the standpoints of heat resistance, moldability and mechanical characteristics and so on that the copolymer comprises at least 70 mole %, preferably at least 80 mole % of p-phenylene sulfide units. Among such copolymers, block copolymers as described in, e.g., JP-A 81-14228 are superior to random ones in processability, heat resistance and mechanical characteristics, being preferably usable.

Among the above PAS resins, it is particularly preferable to use a substantially linear high-molecular-weight polymer prepared by polycondensation of a monomeric material mainly comprising a bifunctional halogenated aromatic compound. Other usable PAS resins include partially branched and crosslinked polymers prepared by using a small amount of a polyhaloaromatic compound having at least three halogen atoms as substituents in the above polycondensation; and polymers, exhibiting an improved processability in molding, which are prepared by heating a low-molecular-weight linear polymer in the presence of oxygen at a high temperature to enhance the melt viscosity through an oxidative or thermal crosslinking. Further, it is also preferable to use a mixture of the above linear polymer with the above branched or crosslinked polymer.

The melt viscosity of the PAS resin to be used in the present invention is preferably 50 to 10000 Poise (as determined at 310° C. and a shear rate of 1200/second). In particular, a PAS resin having a melt viscosity ranging from 100 to 5000 Poise is preferable, because it is excellent in the balance between mechanical characteristics and flowability. When the melt viscosity is too small, the resulting composition will be poor in mechanical characteristics, while when it exceeds 10000 Poise, the resulting composition Will be poor in flowability in the injection molding to result in a difficult operation of molding.

The ester compound (B) which is a constituent characteristic of the present invention is an ester compound composed of an at least di- or poly-basic aliphatic carboxylic acid and a monohydric aliphatic alcohol.

The polybasic aliphatic carboxylic acid composing the ester (B) includes oxalic acid, malonic acid, succinic acid, adipic acid, butanedicarboxylic acid and butanetetracarboxylic acid. Among these acids, butanetetracarboxylic acid, butanedicarboxylic acid, succinic acid and adipic acid are preferably used. Butanetetracarboxylic acid is most preferable.

On the other hand, the monohydric aliphatic alcohol composing the ester (B) includes aliphatic alcohols having 4 to 32 carbon atoms, such as butanol, octanol, lauryl alcohol, stearyl alcohol and behenyl alcohol. Those having 8 to 32 carbon atoms are preferably used.

The ester compound (B) according to the present invention is preferably one prepared by esterifying the polybasic aliphatic carboxylic acid having at least two carboxyl groups with the monohydric aliphatic alcohol. Is still preferable one prepared by esterifying all the carboxyl groups of the carboxylic acid. Particularly preferable specific examples of the ester compound (B) include tetrastearyl ester, tetraoctyl ester, tetrabehenyl ester or distearyl ester of butanetetracarboxylic acid; distearyl ester, dioctyl ester and dibehenyl ester of butanedicarboxylic acid; and distearyl ester, dioctyl ester and dilauryl ester of succinic acid.

The amount of the ester compound (B) to be used in the present invention is 0.01 to 5 parts by weight, preferably 0.05 to 3.0 parts by weight, per 100 parts by weight of the polyarylene sulfide resin. When the amount is too small, the objective improvement in the mold releasing characteristics will not sufficiently be attained, while when it is too large, a problem of gas evolution or the like will occur unfavorably.

In the present invention, it is preferable to add an organic or inorganic filler as the constituent (C) for the purpose of obtaining a molded article being excellent in mechanical strengths, rigidity, heat resistance, dimensional stability and electrical properties, though addition of such a filler is not always essential. The filler may be fibrous, granular, powdery or flaky according to purpose.

The fibrous filler includes organic fibers such as an aramide fiber; and inorganic fibrous materials, for example, a glass fiber, an asbestos fiber, a carbon fiber, a silica fiber, a silica/alumina fiber, a zirconia fiber, a boron nitride fiber, a silicon nitride fiber, a boron fiber, a potassium titanate fiber and fibers of metals such as stainless steel, aluminum, titanium, copper and brass. Among these fibrous fillers, a glass fiber and a carbon fiber are particularly representative.

The powdery and granular fillers include carbon black, silica, silica flour, a glass bead, a glass powder, silicates such as calcium silicate, aluminum silicate, kaolin, talc, clay, diatomaceous earth and wollastonite; metal oxides such as iron oxides, titanium oxide, zinc oxide and alumina; metal carbonates such as calcium carbonate and magnesium carbonate; metal sulfates such as calcium sulfate and barium sulfate; silicon carbide, silicon nitride and various metal powders.

The flaky filler include mica, a glass flake and various metal foils. The hollow filler includes a "shirasu" (a white arenaceous sediment) balloon, metal balloons and a glass balloon.

These fillers may be used alone or as a mixture of two or more of them. The combined use of a fibrous filler, particularly a glass fiber, carbon fiber or potassium titanate fiber, with a granular filler and/or a flaky filler is particularly suitable for producing a molded article being excellent in mechanical strengths and in dimensional accuracy and as well electrical properties. The amount of the filler to be used is at most 300 parts by weight, preferably 5 to 250 parts by weight, still preferably 10 to 200 parts by weight, per 100 parts by weight of the polyarylene sulfide resin. When the amount is too small, the resulting composition will be poor in rigidity and mechanical strengths. When it is too large, the resulting composition will be unfavorably involved in difficulty in molding operation problems in mechanical characteristics of the molded article.

It is preferable that the above filler be surface-treated or sized with a functional compound such as an epoxy compound, an isocyanate compound, a silane compound and a titanate compound or a polymer. It may be sized to a bundle of some pieces thereof with such a sizing agent. Such a compound may be preliminarily applied onto the filler to conduct the surface treatment or the sizing treatment. Alternatively it may be added together with the filler to the preparatory composition.

The composition of the present invention may further contain boron nitride as the constituent (D), though this nitride is not always essential. The addition of boron nitride accelerates crystallization during molding and solidification stage, acting synergistically with the mold releasing agent (B) to make the molding step more improved and shorten a molding cycle. This way results of the invention can be more remarkable. The boron nitride to be used is preferably a powder having a mean particle diameter of 0.2 to 10 μm, though it is not particularly limited. Further, such boron nitride can generally be produced by heating boron in a nitrogen gas stream at 1000° C. or above, or by heating a mixture of ammonia with boron oxide or a mixture of ammonium chloride with borax, though the production process thereof is not particularly limited. The amount of the boron nitride to be added is 0.005 to 2 parts by weight, preferably 0.01 to 1 part by weight, per 100 parts by weight of the polyarylene sulfide resin.

The composition of the present invention may further contain another thermoplastic resin such as polyvinyl chloride resin, polyvinylidene chloride resin, a polyolefin resin, polycarbonate resin, a polyester resin, a polyamide resin, a natural or synthetic rubber as an auxiliary component in a small amount of for example 1 to 30 parts by weight, depending upon the object of the composition.

Addition of a polyolefin resin such as an olefinic elastomer prepared from α-olefin and a glycidyl ester of unsaturated acid or a polyamide resin is generally suitable for improving the toughness and the impact resistance of PAS resin or compositions thereof. However such addition is disadvantageous, worsening the mold releasing characteristics and the moldability of PAS resin or compositions thereof. Therefore, improvement in these respects has been expected. The composition according to the present invention is remarkably improved particularly in the respects, being extremely useful.

If necessary, the composition of the present invention may further contain various additives, such as flame retardants, antioxidants, ultraviolet absorbers, lubricants, mold releasing agents, nucleating agents, blowing agents, crosslinking agents and colorants.

The composition of the present invention may be prepared in conventional ways. It may be prepared by adding the above constituents and, if necessary, other components to PAS resin, heating and melting it and kneading it. For example, the necessary components are preliminarily mixed in a mixing machine such as tumbler or Henschel mixer to obtain a homogeneous mixture and it is fed into a single- or twin-screw extruder to conduct melt-kneading action and pelletization. In this case, all the components may be added simultaneously or some may be added separately.

The kneading is conducted at a temperature being higher than the melting point of the resin component by 5° to 100° C., particularly preferably at a temperature being higher than the melting point thereof by 10° to 60° C.

The PAS resin composition of the present invention is so excellent in mold releasing characteristics in molding that the molding cycle thereof can be shortened, and the article molded from the composition has good surface appearance and is excellent in mechanical characteristics.

The molding cycle is a period in time taken for the entire molding steps including opening a mold, injecting the composition, cooling and releasing the product from the mold. It can be shortened by shortening the time for each step such as the injecting step and the cooling step. The invention can shorten the molding cycle more than the prior state of arts. The improvement of the invention is expressed in terms of a critical molding cycle, that is, the minimum molding period in time.

[EXAMPLE]

The present invention will now be described in more detail by referring to the following Examples, though the present invention is not limited by them.

Examples 1 to 6 and Comparative Examples 1 to 4

Each of the ester compounds (as the constituent (B)) listed in Table 1 and glass fiber (as the constituent (C)) were added to a PPS resin, a product of Kureha Chemical Industry Co., Ltd., "Fortron KPS" (tradename), followed by premixing them using a Henschel mixer for 5 minutes. The premixtures thus obtained were each pelletized by the use of an extruder at a cylinder temperature of 310° C.

Tensile test specimens were molded from the pellets prepared above by the use of an injection molding machine at a cylinder temperature of 320° C. and a mold temperature of 150° C. according to ASTM D638, and examined for tensile strength.

Further, the pellets prepared above were injection-molded under the same conditions as those employed above by the use of a boxy mold equipped with a pressure sensor on the ejector pin to determine the pressure necessary for the release of the molded article from the mold. The pressure thus determined was regarded as the mold release resistance of the composition. Further, the obtained molded article was examined for the presence of marks or scars, and the minimum cycle time for molding not accompanied with any mark was regarded as the critical molding cycle of the composition. Furthermore, the molded article was examined also for the state of surface (surface appearance).

The surface appearance was determined by observing the surface of the boxy molded article prepared above to evaluate the smoothness, gloss, evenness in color, etc. relatively, and was graded as follows:

good A→←D bad

For comparison, a composition not containing the constituent (B) and compositions containing mold release agents (b-1 to b-3) not according to the present invention (B) were prepared and examined, and the results are also given in Table 1.

Examples 7 to 12 and Comparative Examples 5 and 6

As specified in Table 2, compositions further containing boron nitride (as the constituent (D)) and/or other resins (as the constituent (E)) were prepared and evaluated in the same manners as those employed above. The results are given in Table 2.

TABLE 1

|  | Ex. 1 | Ex. 2 | Ex. 3 | Ex. 4 | Ex. 5 | Ex. 6 | Comp. Ex. 1 | Comp. Ex. 2 | Comp. Ex. 3 | Comp. Ex. 4 |
|---|---|---|---|---|---|---|---|---|---|---|
| (A) PPS resin [pts. by wt.] | 100 | 100 | 100 | 100 | 100 | 100 | 100 | 100 | 100 | 100 |
| (B) Mold release agent [pts. by wt.] | B-1 | B-1 | B-1 | B-2 | B-3 | B-4 | — | b-1 | b-2 | b-3 |
|  | 0.1 | 1.0 | 3.0 | 1.0 | 1.0 | 1.0 |  | 1.0 | 1.0 | 0.1 |
| (C) Glass fiber [pts. by wt.] | 65 | 65 | 65 | 65 | 65 | 65 | 65 | 65 | 65 | 65 |
| Tensile strength [kg/cm$^2$] | 1850 | 1810 | 1760 | 1800 | 1780 | 1790 | 1780 | 1550 | 1530 | 1700 |
| Mold release resistance [kg] | 35 | 30 | 25 | 30 | 35 | 35 | 140 | 65 | 40 | 50 |
| Surface appearance | B | A | A | A | A | A | B | C | B | B |
| Critical molding cycle [s] | 45 | 40 | 40 | 40 | 45 | 45 | 60 | 65 | 55 | 55 |

*B-1: tetrastearyl ester of butanetetracarboxylic acid
B-2: dioctyl ester of butanedicarboxylic acid
B-3: distearyl ester of butanetetracarboxylic acid
B-4: distearyl ester of succinic acid
b-1: polyethylene wax
b-2: glycerol tristearate
b-3: lauryl laurate

TABLE 2

|  | Ex. 7 | Ex. 8 | Ex. 9 | Ex. 10 | Ex. 11 | Ex. 12 | Comp. Ex. 5 | Comp. Ex. 6 |
|---|---|---|---|---|---|---|---|---|
| (A) PPS resin [pts. by wt.] | 100 | 100 | 100 | 100 | 100 | 100 | 100 | 100 |
| (B) Mold release agent [pt. by wt.] | B-1 1.0 | B-1 1.0 | B-2 1.0 | B-1 1.0 | B-1 1.0 | B-1 1.0 | — | — |
| (C) Glass fiber [pts. by wt.] | 65 | 65 | 65 | 65 | 65 | 65 | 65 | 65 |
| (D) Boron nitride [pt. by wt.] | 0.05 | 0.1 | 0.1 | — | — | 0.1 | — | — |
| (E) Other resin [pts. by wt.] | — | — | — | E-1 5 | E-2 5 | E-1 5 | B-1 5 | E-2 5 |
| Tensile strength [kg/cm$^2$] | 1910 | 1930 | 1900 | 1500 | 1640 | 1600 | 1550 | 1690 |
| Mold release resistance [kg] | 25 | 20 | 25 | 60 | 50 | 45 | 170 | 160 |
| Surface appearance | A | A | A | B | B | A | D | D |
| Critical molding cycle [s] | 35 | 30 | 30 | 55 | 50 | 45 | 95 | 80 |

*E-1: ethylene/glycidyl methacrylate copolymer elastomer
E-2: nylon 66

I claim:

1. A polyarylene sulfide resin composition having good mold-releasing characteristics and good mechanical properties, comprising:

(A) 100 parts by weight of a polyarylene sulfide resin, (B) 0.01 to 5 parts by weight of an ester compound composed of 1 molecule of a butanetetracarboxylic acid and from 2 to 4 molecules of a monohydric aliphatic alcohol, and (C) 0 to 300 parts by weight of a filler.

2. The composition as claimed in the claim 1, wherein the monohydric aliphatic alcohol composing the component (B) is a $C_4$–$C_{32}$ aliphatic alcohol.

3. The composition as claimed in the claim 1, wherein the amount of the filler (C) is 5 to 250 parts by weight and the filler is at least one member selected the group consisting of inorganic fibrous fillers, organic fibrous fillers, powdery fillers, granular fillers and flaky fillers.

4. The composition as claimed in claim 1, which further contains (D) boron nitride powder in an amount of 0.005 to 2 parts by weight per 100 parts by weight of the component (A).

5. The composition as claimed in claim 1, which further contains (E) at least one member selected from the group consisting of olefinic elastomers and polyamide in an amount of 0.5 to 25 parts by weight per 100 parts by weight of the component (A).

6. The composition as claimed in claim 1, wherein said ester compound is composed of 1 molecule of said butanetetracarboxylic acid and 4 molecules of said monohydric aliphatic alcohol.

7. The composition as claimed in claim 1, wherein said ester compound is composed of 1 molecule of said butanetetracarboxylic acid and 2 molecules of said monohydric aliphatic alcohol.

8. The composition as claimed in claim 1, wherein said ester compound is a distearyl ester of said butanetetracarboxylic acid.

9. The composition as claimed in claim 1, wherein said ester compound is selected from the group consisting of a tetrastearyl ester of said butanetetracarboxylic acid, a tetraoctyl ester of said butanetetracarboxylic acid, and a tetrabehenyl ester of said butanetetracarboxylic acid.

10. The composition as claimed in claim 1, wherein said ester compound is a tetrastearyl ester of said butanetetracarboxylic acid.

11. The composition as claimed in claim 4, wherein said boron nitride powder has a mean particle diameter of from 0.2 to 10 micrometers.

* * * * *